United States Patent [19]

Yamazaki et al.

[11] Patent Number: 4,544,862
[45] Date of Patent: Oct. 1, 1985

[54] LIGHTING CIRCUIT FOR ELECTRIC DISCHARGE LAMP

[75] Inventors: Hiroyoshi Yamazaki, Kamakura; Yoshiji Minagawa, Chigasaki; Michihiro Tsuchihashi, Kamakura; Yoshinori Anzai, Zushi; Toshiro Kajiwara, Yokohama, all of Japan

[73] Assignee: Mitsubishi Denki Kabushiki Kaisha, Tokyo, Japan

[21] Appl. No.: 589,560

[22] Filed: Mar. 14, 1984

[30] Foreign Application Priority Data

Mar. 14, 1983 [JP] Japan ................................. 58-41806

[51] Int. Cl.[4] ............................................ H05B 37/02
[52] U.S. Cl. ................................. 315/209 R; 315/101; 315/105; 315/226; 315/DIG. 2; 315/DIG. 7
[58] Field of Search ............. 305/209 R, 226, DIG. 7, 305/DIG. 2

[56] References Cited

U.S. PATENT DOCUMENTS

| 3,422,309 | 1/1969 | Spira | 315/194 |
| 3,619,716 | 11/1971 | Spira | 315/244 |
| 3,789,266 | 1/1974 | Polman et al. | 315/194 |
| 3,824,428 | 7/1974 | Spira et al. | 315/244 |
| 3,889,152 | 6/1975 | Bodine et al. | 315/206 |
| 4,087,722 | 2/1978 | Hancock | 315/206 |
| 4,170,747 | 10/1979 | Holmes | 315/DIG. 7 |
| 4,251,752 | 2/1981 | Stolz | 315/206 |
| 4,277,728 | 7/1981 | Stevens et al. | 315/DIG. 7 |
| 4,370,600 | 1/1983 | Zansky | 315/244 |

Primary Examiner—Harold Dixon
Attorney, Agent, or Firm—Oblon, Fisher, Spivak, McClelland & Maier

[57] ABSTRACT

A lighting circuit for an electric discharge lamp according to the present invention is constructed in such a way that a switching device is provided at an output terminal of a high frequency inverter which produces a substantially sinusoidal output voltage, and that, by controlling this switching device, an output to the low pressure electric discharge lamp is stopped at the rising part of the abovementioned output voltage in its half cycle, while the output is supplied to the low pressure electric discharge lamp at the voltage level in the vicinity of the maximum instantaneous value thereof. By use of the high frequency inverter of a smaller capacity and less radio noise than those in the conventional device, the operating efficiency of the low pressure electric discharge lamp can be increased.

19 Claims, 29 Drawing Figures

FIGURE 2
(a)
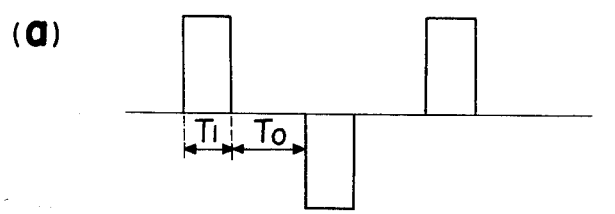
(b)
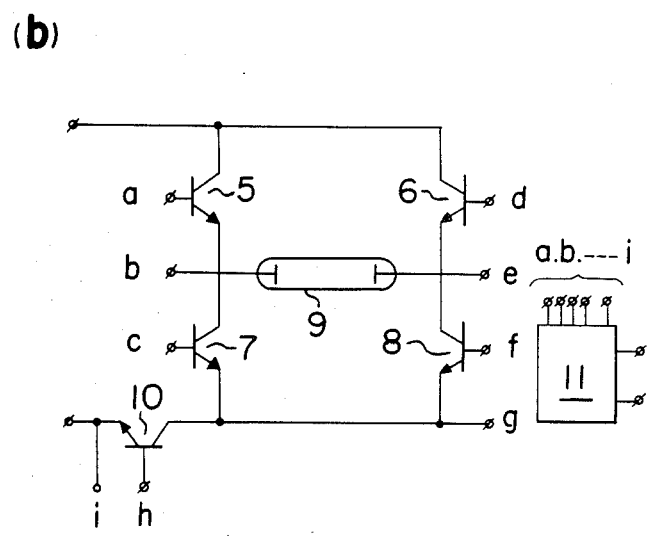

FIGURE 4
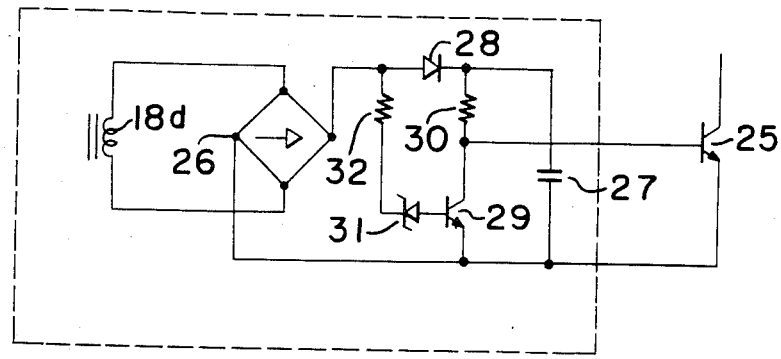
FIGURE 5
(a) 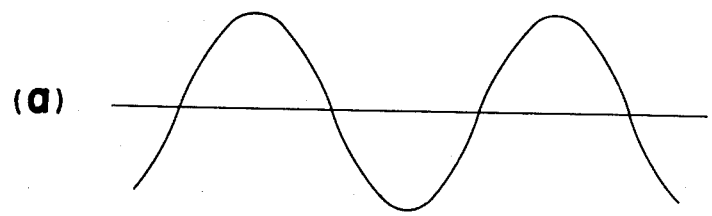
(b) 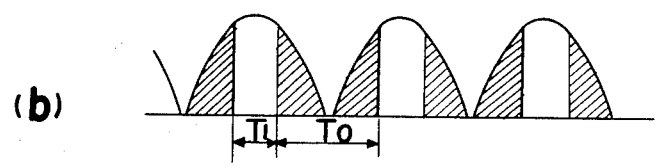
(c) 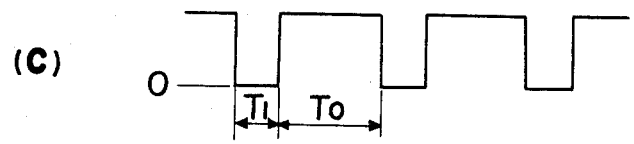
(d) 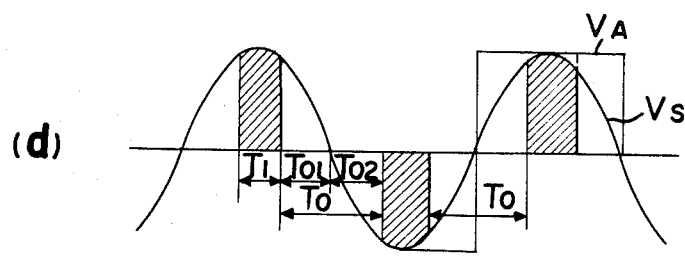

FIGURE 20
(a) 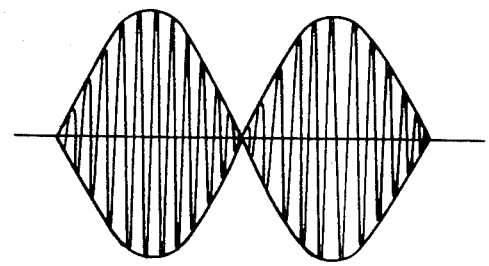
(b) 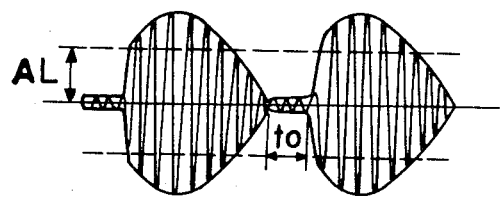
(c) 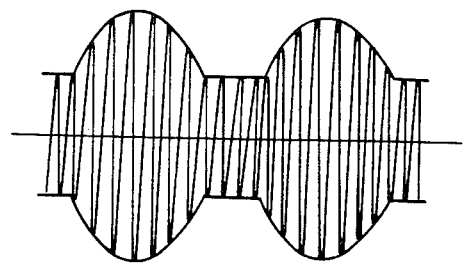
(d) 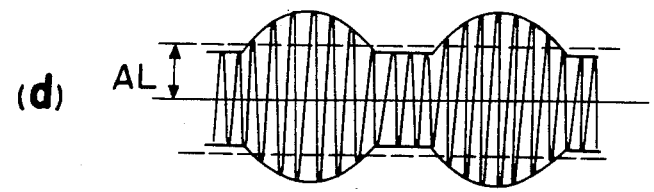

LIGHTING CIRCUIT FOR ELECTRIC DISCHARGE LAMP

BACKGROUND OF THE INVENTION

1. Field of the Invention

This invention relates to a lighting circuit for an electric discharge lamp such as a fluorescent lamp, a rare gas electric discharge lamp for near infra-red rays, and other low pressure electric discharge lamps. More particularly, the present invention is concerned with a lighting circuit for such electric discharge lamp which causes it to operate by application of a high frequency voltage having a pause-time period for every half cycle.

2. Description of the Prior Art

First of all, explanations will be given as to the conventional technique for operating the low pressure electric discharge lamp by application of a voltage having a pause-time period.

Japanese unexamined utility model publication No. 4779/1973 discloses a lighting circuit of a construction, in which use is made of a turn-off thyristor provided in parallel with a fluorescent lamp to thereby convert a lamp voltage $V_L$ in a sinusoidal waveform into a plurality of pulse voltage as shown in FIG. 1(a) of the accompanying drawing. This lamp voltage $V_L$, however, is of commercial frequency, the purpose of which is to reduce a size of a choking coil as a current limiting impedance, hence the prior right invention differs from the present invention.

In the above-described conventional technique, the pulse voltage in the half cycle of the commercial frequency is in one and the same direction. However, Japanese unexamined patent publication No. 36786/1976 discloses an improved technique, wherein the pulse voltage is made in an alternate direction. This prior right invention also aims at size-reduction of the choking coil, the frequency band for use of which is different from that of the present invention, hence no improvement can be attained in the operating efficiency of the low pressure electric discharge tube to be mentioned later.

Further, Japanese unexamined patent publication No. 115078/1976 discloses a lighting circuit for a fluorescent lamp having a capacitive current limiting impedance composed of a serial connection of a capacitor 1 and a choking coil 2 as shown in FIG. 1(b), wherein a switching device 4 is provided in parallel with a lamp 3 to effect short-circuiting of the switching device once every half cycle at the trailing part (those hatch-lined portions in FIG. 1(c)) of the lamp current $I_L$ in a sinusoidal waveform of a commercial frequency. This disclosed art is, however, to facilitate restrike of the electric discharge lamp by increasing a charging voltage $V_C$ of the capacitor 1 at the time of the restriking.

U.S. Pat. No. 3,789,266, which is the closest prior art to the present invention, discloses improvement in efficiency of the abovementioned electric discharge lamp, wherein a high frequency interrupted current having a conduction period $T_1$ and a breaking period (hereinafter called "pause-time period") $T_0$, and the current direction of which reverses at every changing of the conduction period and the pause-time period. A device for flowing electric current such as mentioned above is limited to a circuit shown in FIG. 2(b). This circuit is constructed with a bridge circuit, in which transistors 5, 6, 7 and 8 are arranged on four sides and an electric discharge lamp 9 is connected across the diagonal line; another transistor 10 provided in series with the input side of the bridge circuit; and a control device 11 which performs controls of opening and closing of the transistors 5, 6, 7, 8, and 10 to thereby cause electric current to flow as shown in FIG. 2(a).

In such device, however, the voltage to be applied to the transistors 5, 6, 7 and 8 is in a rectangular waveform, at a high voltage portion of which the pause-time period $T_0$ is formed by the transistor 10 with the consequent disadvantages such that the capacity of the device should essentially be made larger, and that the radio noise is also high. As the results of various studies and experiments made on the operating of the low pressure mercury-vapor electric discharge lamp such as fluorescent lamp with a high frequency voltage having the pause-time period as disclosed in Japanese unexamined patent publication No. 196497/1982 and Japanese patent application No. 110369/1981, the present inventors have discovered that the lamp efficiency can be further improved from the values as shown in the above-discussed U.S. Pat. No. 3,789,266.

SUMMARY OF THE INVENTION

It is therefore an object of the present invention to provide a lighting circuit having much higher utility than those lighting circuit disclosed in the abovedescribed published applications filed by the present inventors.

It is another object of the present invention to provide a lighting circuit for an electric discharge lamp which has improved the abovementioned various disadvantages inherent in the conventional device, wherein use is made of a high frequency inverter to energize a low pressure electric discharge lamp, the inverter having a characteristic such that its output voltage take a substantially sinusoidal waveform. In such high frequency inverter, a pause-time period $T_0$ is formed at least at a rising part of its sinusoidal output voltage where an instantaneous value is small, and the electric power is supplied to the abovementioned low pressure electric discharge lamp at a portion where the instantaneous value of the abovementioned output voltage is large, thereby increasing efficiency of the abovementioned low pressure electric discharge lamp, and improving the radio noise with the lighting circuit of a relatively small capacity.

BRIEF DESCRIPTION OF THE DRAWINGS

The foregoing objects, other objects as well as specific constructions, functions, and operating principle as of the lighting circuit for an electric discharge lamp according to the present invention will become more apparent understandable from the following detailed description of preferred embodiments thereof, when read in conjunction with the accompanying drawing.

In the accompanying drawing:

FIGS. 2(a) and 2(b) are explanatory diagrams of another conventional device and its circuit construction;

FIG. 4 is a circuit diagram of the main part of the device shown in FIG. 3;

FIGS. 5(a), 5(b), 5(c), 5(d) and 5(e), and FIG. 6(a), 6(b), 6(c), 6(d) and 6(e) are respectively explanatory diagrams of the lighting circuit shown in FIG. 3;

FIGS. 20(a), 20(b), 20(c) and 20(d) are diagrams for showing the background of the tenth embodiment of the circuit according to the present invention;

DETAILED DESCRIPTION OF THE PREFERRED EMBODIMENTS

In the following, the present invention will be described in detail with reference to preferred embodiments thereof shown in the accompanying drawing.

Figure 1A:
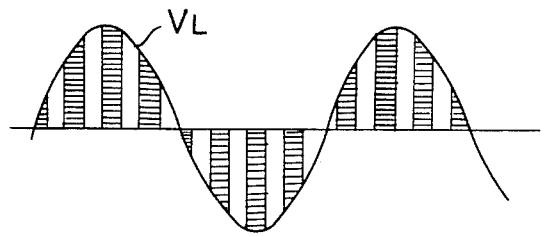
FIGS. 1(a), 1(b) and 1(c) are explanatory diagrams of a conventional device.
Figure 1B:
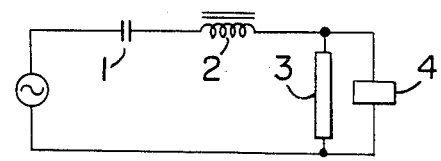
Figure 1C:
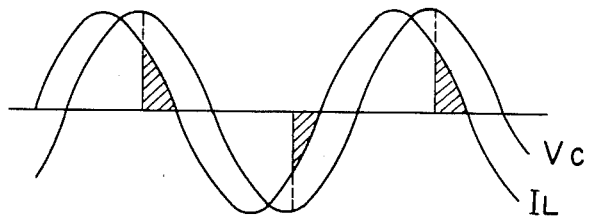
Figure 3:
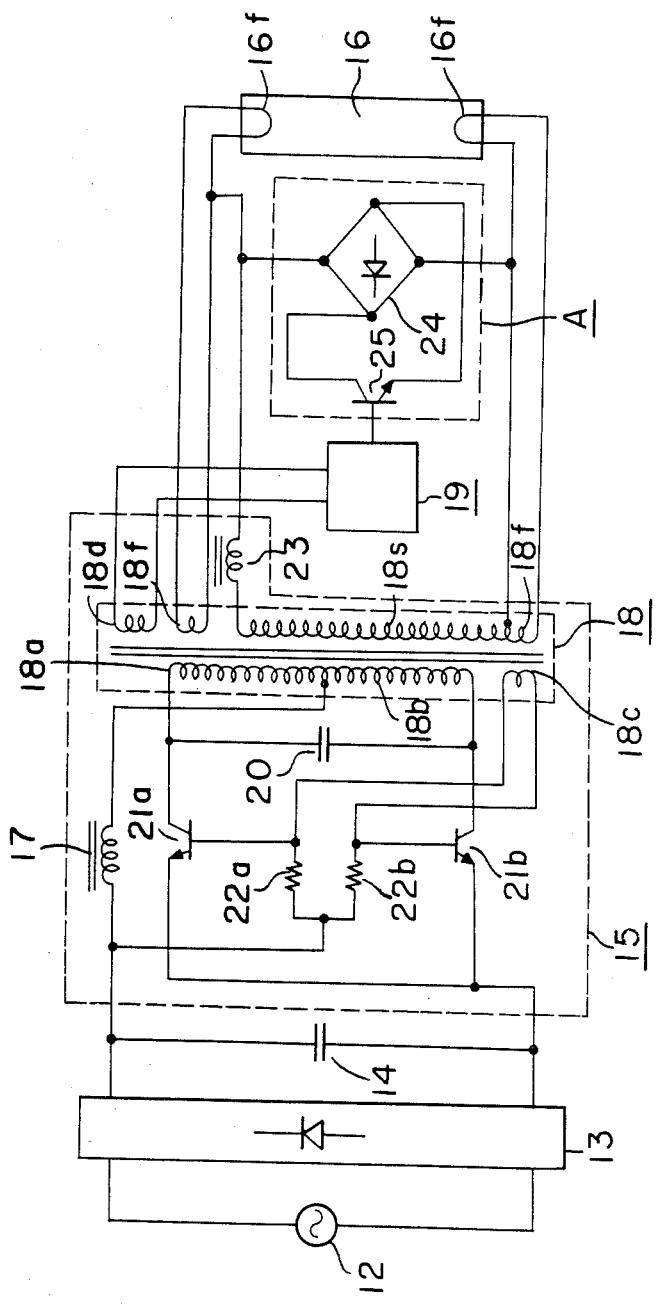
FIG. 3 is a circuit diagram showing the first embodiment of the lighting circuit according to the present invention.

Referring first of FIG. 3 showing a circuit diagram of the lighting circuit for an electric discharge lamp according to the first embodiment of the present invention, a reference numeral 12 designates a commercial alternating current power source, a numeral 13 refers to a rectifying device for the full-wave rectification of the power source 12, a numeral 14 refers to a smoothing capacitor, and a reference numeral 15 denotes a high frequency inverter to energize a fluorescent lamp 16 as a low pressure electric discharge lamp. In this embodiment, there is used a self-excited, constant current type push-pull transistor inverter.

The inverter 15 is constructed as mentioned in the following: a high frequency choking coil 17 provided at the input terminal of the inverter 15; an output transformer 18; the primary windings 18a, 18b, at the connection of which the high frequency choking coil 17 is connected; a feedback winding 18c; a secondary winding 18s; pre-heating windings 18f, 18f to preheat those preheating type electrodes 16f, 16f of a lamp 16; a power source winding 18d of a control device 19 to be described later; a resonating capacitor 20 connected in parallel with the primary windings 18a, 18b; a pair of transistors 21a, 21b as the active components connected between the primary windings 18a, 18b and the negative terminal of the capacitor 14; a pair of base resistors 22a, 22b; and a choking coil 23 which functions as a current limiting impedance to the electric current flowing through the lamp 16. A reference letter A designates a switching device provided in parallel with the lamp 16 at the output terminal of the inverter 15, and is constructed with a full-wave rectification circuit 24, the alternating current terminal of which is connected in parallel with the lamp 16, and a transistor 25 disposed at the direct current terminal of this rectification circuit 24.

FIG. 4 is a circuit diagram showing one embodiment of the control device 19 for the transistor 24. In the drawing, a reference numeral 18d designates a power source winding provided in the transformer 18, a numeral 26 refers to a diode bridge which performs the full-wave rectification of a high frequency of a low voltage induced in the winding 18d, a reference numeral 27 represents a smoothing capacitor connected with the output terminal of the diode bridge through a back-flow preventing diode 28, and a reference numeral 29 denotes a transistor connected in parallel with the capacitor through a resistor 30, which is also disposed between the base and the emitter of the transistor 25. Incidentally, a reference numeral 31 designates a constant voltage diode connected with the base of the transistor 29 through a resistor 32.

In the lighting circuit of such construction as mentioned above, when a voltage is applied to it from the power source 12, a smoothed direct current formed by the rectification device rectifier 13 and the capacitor 14 is introduced as an input into the inverter 15, whereby the transistors 21a, 21b are opened and closed alternately by the actions of the primary windings 18a, 18b, the resonating capacitor 20, the feedback winding 18c, and so forth, and the inverter 15 starts its self-oscillation. In this case, the collector current of the transistors 21a, 21b is rendered to be in a substantially rectangular waveform by the action of the high frequency choking coil 17, whereby the voltage in the primary windings 18a, 18b assumes a substantially sinusoidal waveform. As the result of this, there is generated in the power source winding 18d a high frequency voltage of, for example, 20 kHz, in a substantially sinusoidal waveform, as shown in FIG. 5(a). This high frequency voltage is subjected to the full-wave rectification by the diode bridge 26, from which a voltage as shown in FIG. 5(b) is applied to a constant voltage diode 31, the capacitor 27 is charged, and a smoothed direct current is applied to a serial circuit of the resistor 30 and the transistor 29. Assume now that the constant voltage diode 31 is interrupted in the hatch-lined portion and becomes conductive in the white portion, as shown in FIG. 5(b). A voltage across the collector and the emitter of the transistor 29 takes a shape as shown in FIG. 5(c), while the transistor 25 becomes conductive at the trailing part $T_{01}$ and the rising part $T_{02}$ of the output voltage in the secondary winding 18s in a substantially sinusoidal waveform (in general, a high harmonic component is superposed in it to some extent) as shown in FIG. 5(d) to thereby form the pause-time period $T_0$, and it is interrupted during a period $T_1$ in the vicinity of the maximum instantaneous value of the output voltage, whereby a voltage as shown by a hatch-lined portion in FIG. 5(d) is applied to the lamp 16.

On the other hand, the electrode 16f is preheated by a voltage in the sinusoidal waveform which has been induced in the preheating winding 18f, and, as soon as the electrode 16f is heated to a predetermined temperature level, the lamp 16 is lit. In this case, the voltage to be applied to the lamp 16 (i.e., the voltage in the hatch-lined portion in FIG. 5(d)) lowers for a portion of a voltage drop in the choking coil 23, although it hardly changes during the time periods of $T_1$, $T_{01}$, $T_{02}$, and $T_0$. The reason for this is that a starting voltage for the lamp 16 at its high frequency operating is in general higher than in the case of the commercial frequency operating, and the voltage for operating the lamp is low, on account of which the inverter 15 has a constant current characteristic at the output side, and the output current of the inverter 15 assumes a substantially continuous sinusoidal waveform at the time of both conduction and interruption of the transistor 25. The output current is in substantially the same waveform as that shown in FIG. 5(d), the blank portion indicating a short-circuit current flowing in the switching device A, and the hatch-lined portion indicating a lamp current flowing in the lamp 16.

In the conventional circuit shown in FIG. 2(b), and those circuit shown in the afore-described Japanese unexamined patent publication No. 196497/1982 and Japanese patent application No. 110369/1981, the output voltage as shown in FIG. 2(a) is only applied to the lamp 9, etc. through the current limiting impedance, so that no lamp current as shown in FIG. 2(a) cannot be obtained unless the current limiting impedance is a resistor (even in this case, it is difficult to put this circuit construction into practice so far as a complicated control circuit is added to it, since the power loss is great). More specifically, in the case of the inductive impedance, the lamp current takes a triangular waveform with gentle rising, while, in the case of the capacitive impedance, the lamp current takes a triangular waveform with gentle trailing, both cases not being able to afford sufficient lamp efficiency, and the efficiency being particularly low in the former case. This is due to the fact that the improvement in the lamp efficiency by the provision of the pause-time period $T_0$ owes very much to the effect such that the electron density at a high temperature level becomes higher than at the time of direct current operating and commercial frequency operating by causing a current with a steep rising part to flow in the lamp which has been cooled during the pause-time period $T_0$.

Unlike the conventional device as mentioned above, in the circuit construction of this embodiment of the present invention, wherein the switching device A is provided in parallel with the lamp 16, even if the constant current characteristic at the output side of the inverter 15, for example, is not so perfect as mentioned in the foregoing, there can be obtained fair waveforms with steep rising part as shown by the hatch-lined portions in FIG. 5(d) for both voltage and current of the lamp 16 by the counter-electromotive force of the current limiting impedance 23 due to the short-circuit current, irrespective of whether the current limiting impedance 23 is resistance, inductance, or capacitance, whereby the operating efficiency of the lamp 16 improves remarkably.

Further, the output voltage from the bridge type inverter shown in FIG. 2(b) is in a rectangular waveform $V_A$ as shown in the right half of FIG. 5(d), in contrast to which the output voltage from the inverter 15 is in a sinusoidal waveform as designated by $V_S$ in FIG. 5(d). In comparison with the rectangular waveform of the former, since the sinusoidal waveform of the latter has its pause-time period $T_0$ formed at a relatively small portion of the instantaneous voltage value, its output capacity can be smaller than the former.

The transistors 10 and 25 both perform their respective switching operations at a substantially same voltage and with a substantially same current, hence the switching loss may be substantially equal between both transistors. However, in contrast to that the transistors 5, 6, 7 and 8 perform their switching operations at a high voltage and with a current in the rectangular waveform, the collector current of the transistors 21a, 21b is in a rectangular half waveform as shown in FIG. 6(a), but their voltage betwen the collector and the emitter is in a sinusoidal half waveform as shown in FIG. 6(b), so that their switching loss is theoretically non-existent. Accordingly, the overall efficiency of the lighting circuit as a whole remarkably improves along with improvement in the operating efficiency of the lamp 16.

Further, in the bridge type inverter, the output voltage, the output current, and the collector current and the collector-emitter voltage of the transistors 5, 6, 7 and 8 are all in the rectangular waveform. In contrast to this, in the inverter 15 of the present invention, only the collector current of the transistors 21a, 21b is in the rectangular waveform, while the output voltage, the output current, and the collector-emitter voltage of the transistors 21a, 21b are all in the sinusoidal waveform with the consequence that the lighting circuit of the present invention has a lower radio noise than that in the conventional device.

The reason for the collector current of the transistors 21a, 21b taking the rectangular waveform as mentioned above is as follows. It is now assumed that the output current from the inverter 15 is in the sinusoidal waveform as shown in FIG. 6(c), in which the hatch-lined portion denotes the current flowing in the lamp 16, and the blank portion indicates the short-circuit current produced by the switching device A. If the high frequency choking coil 17 is not present, the output powers produced during the periods of $T_{01}$ and $T_{02}$ for the abovementioned short-circuit current are almost reactive powers, except for the preheating power for the electrode 16f in the inverter 15, with the consequence that the collector current in any one of the transistors 21a, 21b is small during the periods $T_{01}$ and $T_{02}$ as shown in FIG. 6(d) and is large during the period $T_1$.

The passage of a constant base current relative to such remarkably changing collector current not only increases the switching loss in the transistors 21a, 21b, when they are conductive, but also renders the operations of the inverter 15 instable. However, by the provision of the high frequency choking coil 17 having an appropriate inductance, the collector current is smoothed and takes a rectangular waveform as shown in FIG. 6(e). Therefore, by stably operating the inverter 15 by means of a simple base drive circuit composed of the feed-back winding 18c and the base resistors 22a, 22b, the operating efficiency of the inverter 15 can also be improved. The above-mentioned smoothing operation may not be perfect as depicted in FIG. 6(e). Incidentally, the choking coil 17 has an effect of eliminating the high harmonic component to occur in the collector current. While such function may take place in a separately excited inverter, it is particularly effective in the self-excited inverter.

When a leakage type transformer is used as the output transformer 18, the power source winding 18d had better be provided to the side of the primary windings 18a, 18b.

Figure 7:
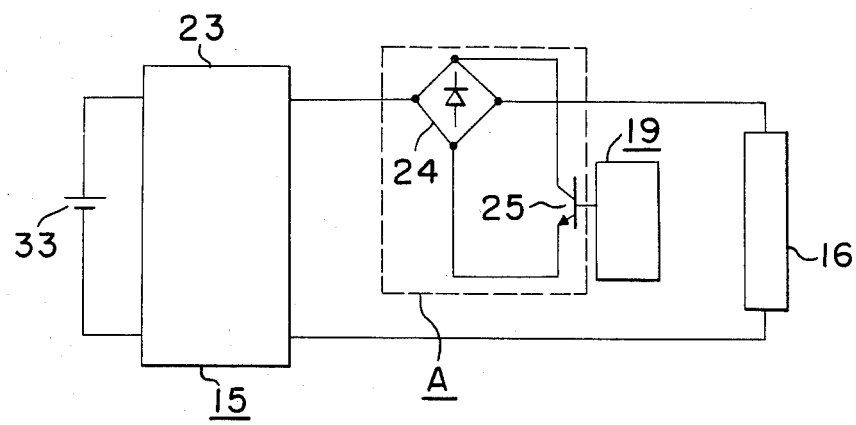
FIG. 7 is a circuit diagram showing the second embodiment of the present invention.
Figure 8:
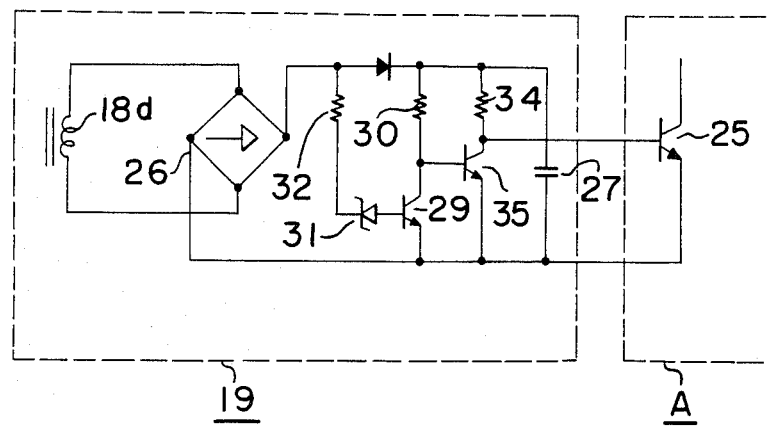
FIG. 8 is a circuit diagram showing the main part of the circuit shown in FIG. 7.

FIG. 7 is a circuit diagram showing the second embodiment of the lighting circuit according to the present invention in which a reference numeral 33 designates a smoothing direct current power source same as that shown in FIG. 3, and a numeral 15 refers to a self-excited, constant current type push-pull transistor inverter also same as that shown in FIG. 3 with exception of using a capacitor 23 as the current limiting impedance. A reference letter A designates a switching device provided in series with the lamp at the output terminal of the inverter 15. This switching device A is constructed with the full-wave rectification circuit 24 with its a.c. terminal being serially connected with the lamp 16, and the transistor 25 provided at the d.c. terminal of this full-wave rectification circuit 24. A numeral 19 refers to the control device for the switching device, the details of which are shown in FIG. 8. The control device 19 is constructed mostly same as that shown in FIG. 4, with the exception that a signal reversing circuit comprising a serial connection of the resistor 34 and the transistor 35 is provided at the rear stage of the serial circuit composed of the transistor 29 and the resistor 30. By the way, in FIG. 7, the electrode 16f and the preheating winding 18f are omitted from illustration.

In the glow starter circuit of the above-described construction, when the power source 33 is closed, the transistor 29 generates the signal as shown in FIG. 5(c) by the same operations as has been explained with reference to FIG. 4. Accordingly, the transistor 35 generates a signal, in which the periods of its conduction and interruption are reversed from those in FIG. 5(c) with the result that the transistor 25 is interrupted during the period $T_0$ and conducted during the period $T_1$, whereby a voltage as shown in the hatch-lined portion of FIG. 5(d) is applied to the lamp 16, as is the case with the first embodiment of the lighting circuit shown in FIG. 3. Since, after starting of the lamp, the current limiting impedance is the capacitor 23, both voltage and current having steep rising part can be obtained for starting the lamp 16, whereby its operating efficiency increases.

In this second embodiment, too, the pause-time period $T_0$ is formed with the periods $T_{01}$ and $T_{02}$, during which the instantaneous value of the ouput voltage in the sinusoidal waveform is small, the operating efficiency of the lamp 16 is seen to be improved with the current limiting impedance of a capacity smaller than that shown in FIG. 2.

Also, since the switching conditions of the transistors 21a, 21b are the same as that of FIG. 3, the switching loss of the transistor is substantially nil.

In view of the fact that the output current from the inverter 15 is as shown by the hatch-lined portion in FIG. 5(d), the radio noise increases more than that shown in FIG. 3, but it is less than that shown in FIG. 2.

Figure 6:
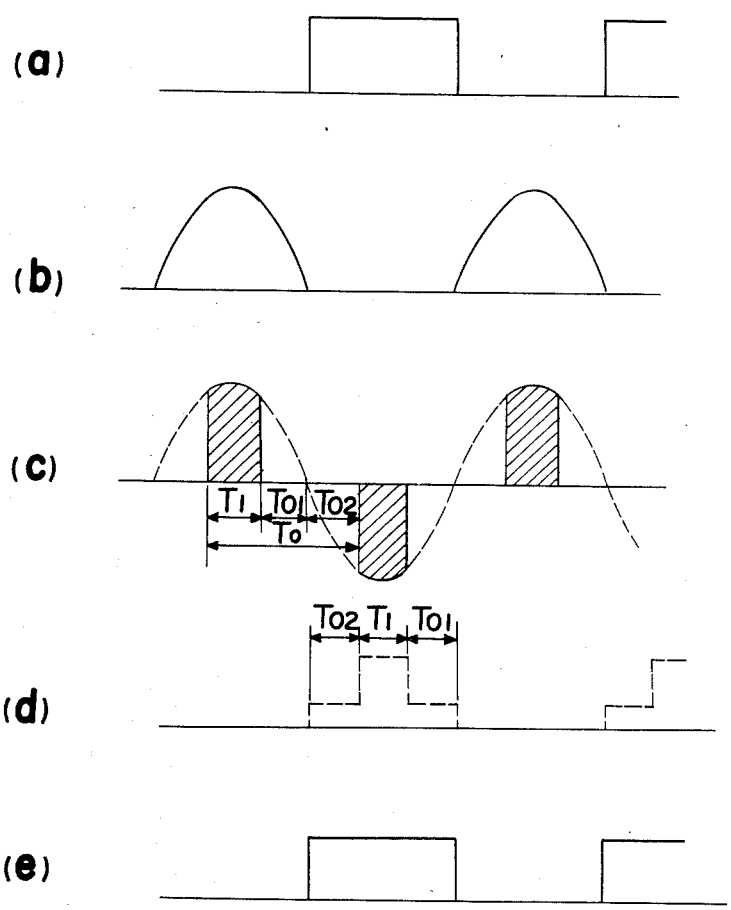

Incidentally, the load applied to the inverter 15 during the pause-time period $T_0$ is only the preheating load of the electrode 16f, hence the effectiveness of the high frequency choking coil 17 as has been explained with reference to FIG. 6 is equally applicable to this second embodiment.

In this embodiment, the variations in the load applied to the inverter during the pause-time period $T_0$ and the period $T_1$ for supplying power to the lamp 16 are greater than the load variations in the first embodiment as shown in FIG. 3, more stable operations can readily be obtained with the inverter 15 of the separately excited type.

By the way, the capacitor 23 may be provided between the rectification circuit 24 and the lamp 16 to obtain the same resulting effect.

Figure 9:
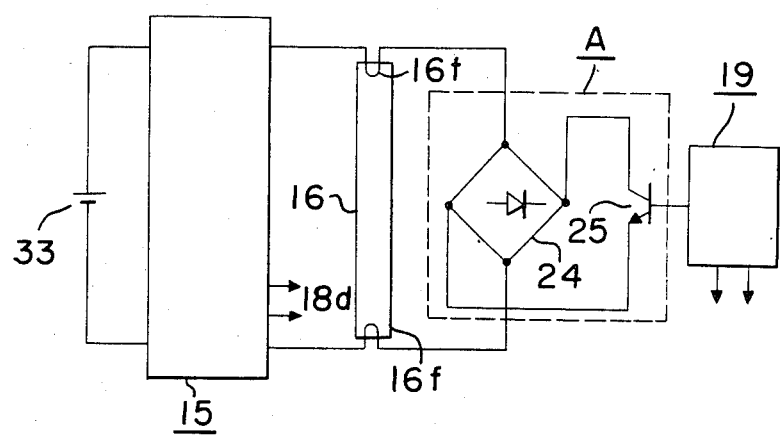
FIG. 9 is a diagram showing the third embodiment of the circuit according to the present invention.

FIG. 9 is a circuit diagram showing the third embodiment of the lighting circuit according to the present invention, in which the same reference numerals as those in the previous figures of drawing designate the identical or corresponding parts. The characteristic feature of this third embodiment resides in that the switching device A is connected to the output terminal of the inverter 15 through the electrodes 16f, 16f in parallel with the lamp 16. Incidentally, the control device 19 is the same as that shown in FIG. 4, using the power source winding 18d as the power source.

The thus constructed lighting circuit operates in the substantially same manner as that shown in FIG. 3, with the exception that current flows through the electrodes 16f, 16f during the pause-time period $T_0$ at the time of starting and lighting of the electric discharge lamp. Such device can also be operated in the same manner as that shown in FIG. 3 without provision of the preheating winding 18f.

Figure 10:
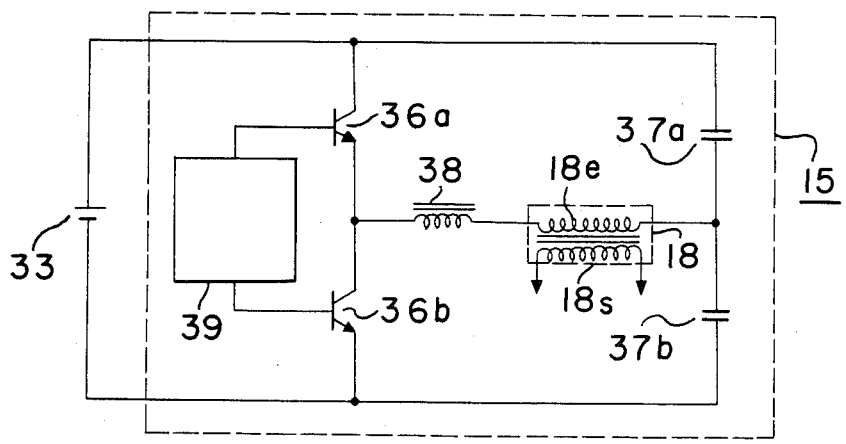
FIG. 10 is a diagram showing a main part of the fourth embodiment of the circuit according to the present invention.

In each of the above-described three embodiments of the lighting circuit for an electric discharge lamp, the inverter 15 is constructed with the constant current type push-pull transistor inverter, but it may be replaced by a serial type transistor inverter as used in the fourth embodiment shown in FIG. 10. This serial type transistor inverter 15 comprises a pair of transistors 36a, 36b and another pair of resonating capacitors 37a, 37b, these pairs of transistors and capacitors constructing the four sides of a bridge circuit, and a resonating choking coil 38 and an output transformer 18, both being connected in series and disposed at the diagonal line in the bridge circuit. To the secondary winding 18s of the transformer 18, there are connected the switching device A, the control device 19, and the lamp 16 in any one of the arrangements shown in FIGS. 3, 7, and 9.

In the device of such construction, when the transistors 36a, 36b are alternately opened and closed in the base drive circuit 39 such as, for example, an integrated circuit (IC) for a switching regulator, there flows in the primary winding 18e a substantially sinusoidal vibrating current with its direction being reversed alternately, whereby a substantially sinusoidal output voltage is obtained in the secondary winding 18s. Consequently, the operating efficiency of the lamp 16 can be increased with the inverter 15 of a small capacity as is the case with the above-described embodiments. The radio noise is also low, since at least the output voltage and the collector current are in the sinusoidal waveform.

It should be noted that the abovementioned effect can be obtained with any type of the lighting circuit of a construction, in which the power supply to the lamp 16 is interrupted at least at the rising part of the voltage in the sinusoidal waveform for its half cycle, and the power supply to the lamp 16 is done in the vicinity of the maximum instantaneous value in the abovementioned half cycle.

Further, while the collector-emitter voltage in the transistors 36a, 36b is in the rectangular half waveform, its collector current is in the sinusoidal half waveform. In this case, too, the switching loss is theoretically nil. Furthermore, when at least any one of the voltage and the current in the active elements of the inverter 19 is in the sinusoidal waveform, the effect as mentioned above can be obtained with other inverter 15.

Figure 11:
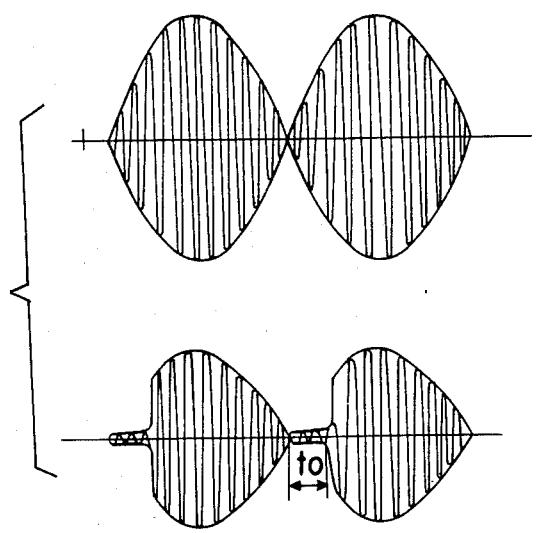
FIG. 11 illustrates waveform diagrams for explaining the fifth embodiment of the circuit according to the present invention.

Although, in the above-described embodiments, the input into the inverter 15 is the smoothed direct current, those devices having the smoothing capacitor 14 incorporated therein is low in the power factor. Therefore, in the ordinary high frequency operation, there is a practice of using a pulsating voltage obtained by full-wave rectification of the a.c. voltage from the power source 12 as the input voltage for the inverter. FIG. 11 shows the output voltage and the output current of the inverter in that case, in which the voltage is an alternating current voltage containing beats therein. However, if the frequency of the inverter is assumed to be, for example, 25 kHz, there exists in the half wave of 50 kHz a high frequency voltage of 250 cycles, whereby the output voltage is in the substantially sinusoidal waveform, when taken in a short period of time.

While such lighting circuit reduces its lamp efficiency to some degree on account of the lamp current becoming quiescent during a time period $T_0$ starting from the zero volt condition in the power source 12. However, when the fifth embodiment of the present invention is applied to such lighting circuit, the operating efficiency of the lamp 16 can be increased to a considerable degree, hence its power factor can be made high.

Figure 12:
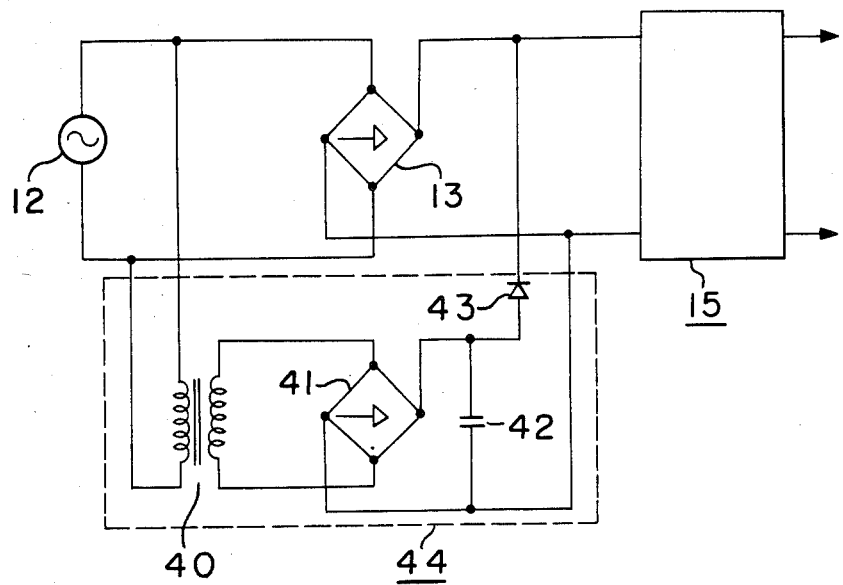
FIG. 12 is a diagram showing a main part of the sixth embodiment of the circuit according to the present invention

With a view to eliminating the current pause-time period $T_0$ as mentioned above, it has usually been a practice in the high frequency operation to provide an auxiliary power source, with which the output voltage from the inverter can be obtained even at the zero voltage level in the power source 12. FIG. 12 illustrates the circuit construction for one example of such auxiliary power source. The auxiliary power source 44 as illustrated is constructed with a step-down transformer 40, a full-wave rectification circuit 41 to perform the full-wave rectification on the output voltage, a capacitor 42 connected to the d.c. terminal of the rectification circuit, and a diode 43. By the way, both terminals of the capacitor 42 are connected with the input terminal of the high frequency inverter 15 through the diode 43.

Figure 13:
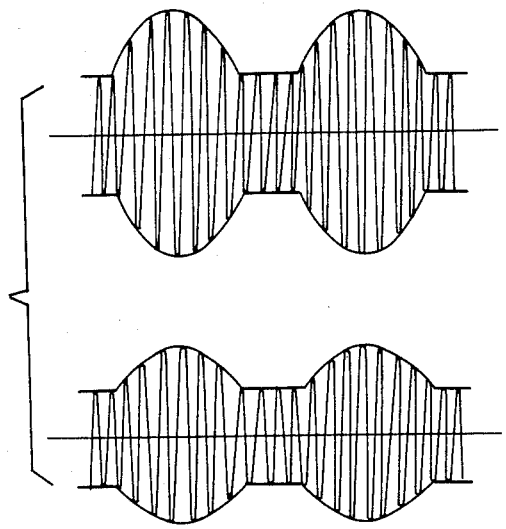
FIG. 13 illustrates waveform diagrams for explaining the circuit shown in FIG. 12.

In the thus constructed auxiliary power source, when the instantaneous value of the pulsating voltage which has been subjected to the full-wave rectification by the rectification device 13 becomes lower than the charged voltage of the capacitor 42, the input voltage of the inverter 15 is supplied from the capacitor 42, and the output voltage and the output current from the inverter 15 are as shown in FIG. 13, wherein the current pause-time period $T_0$ is abscent, with the consequence that the lamp efficiency improves. When the present invention is applied to such construction, there can be obtained various effects as mentioned above, and the lighting circuit with high power factor and a extremely high general efficiency. This is the sixth embodiment of the lighting circuit according to the present invention.

In the above-described embodiments of the present invention, the switching device A is constructed with a combination of the rectification circuit 24 and the transistor 25. It should however be noted that the same effect can also be obtained by use of other switching elements such as a turn-off thyrister, etc.

Although the control device 19 changes its characteristics by the kind of the switching element used for the switching device A, there may be contemplated various kinds of control device such as, for example, the one using a combination of a comparator IC and the drive circuit of the switching element, the one using clock pulses, the one using an integrated circuit (IC) for the switching regulator, or various others.

Figure 14:
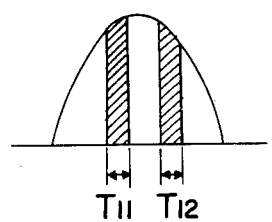
FIG. 14 is an explanatory diagram of the seventh embodiment of the circuit according to the present invention.

For example, when the control device using the clock pulses is employed as the control device 19, it become possible to carry out the power supply to the lamp 16 for twice or more of the time periods $T_{11}$ and $T_{12}$ in the half cycle of the high frequency output voltage. Even with such control device, the operating efficiency of the lamp 16 can be improved, as shown in FIG. 14 which is the seventh embodiment of the lighting circuit of the present invention.

In the preceding description, no particular mention has been made as to the frequency of the inverter 15. However, by the provision of the pause-time period $T_0$ as disclosed in detail in Japanese patent application No. 110369/1981, the improvement in the resulting lamp efficiency is recognized from a frequency of 1 kHz or its vicinity, and, even at the frequency of 80 kHz, considerable improvement could still be obtained. However, from the standpoint of preventing disagreeable audible noises, the frequency of about 17 kHz and above is preferable. Further, when a bipolar type transistor is used for the transistor 25, the frequency of 100 kHz or below is preferable for reducing the switching loss.

In the above-described embodiments, the lamp 16 used is single, although the same effect can be resulted, even when two or more serially connected lamps 16 are used.

Further, in the above-described embodiments, the low pressure electric discharge lamp used is the fluorescent lamp 16. However, the improvement in the lamp efficiency due to provision of the pause-time period $T_0$ could be recognized in other types of the rare gas electric discharge lamp such as a neon lamp 16, a krypton lamp 16, etc., hence the lighting circuit of the present invention can be equally applied to these low pressure electric discharge lamps 16.

In the next place, prior to concrete explanations of the eighth embodiment of the present invention, description will be made as to a circuit structure and its operations for the background of the eighth embodiment in refernece to FIGS. 15 to 17.

Figure 15:
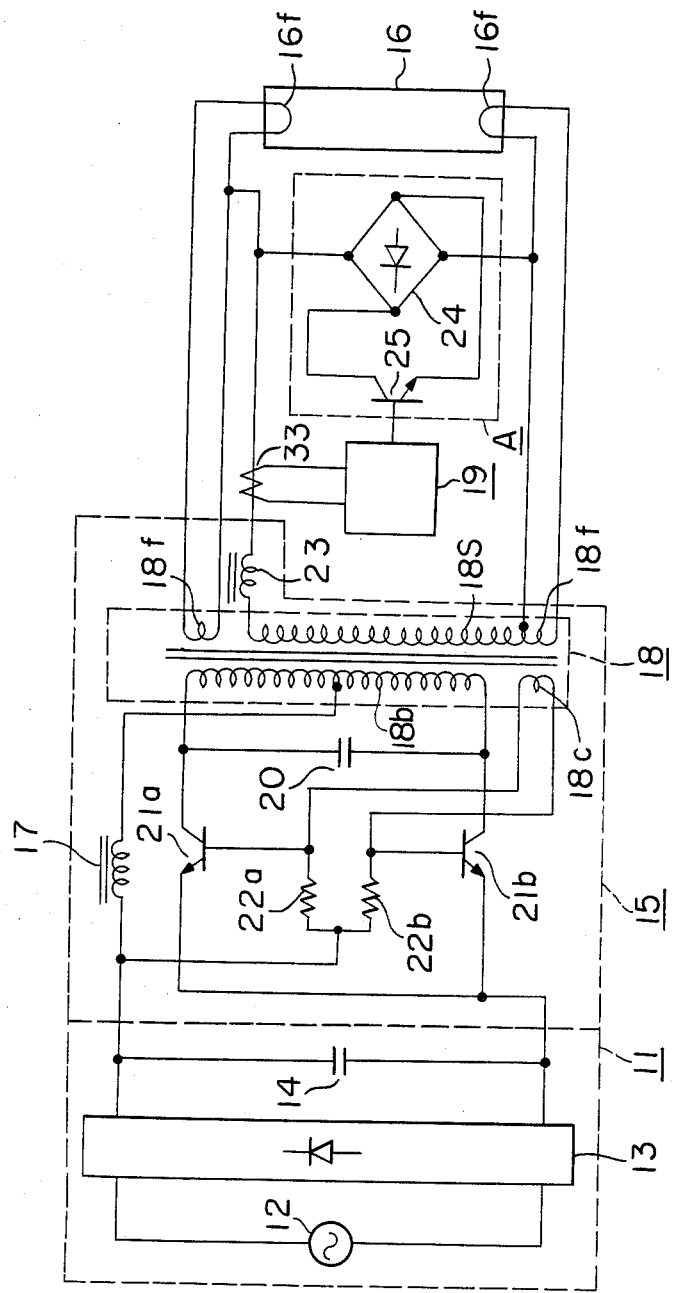
FIG. 15 is a diagram showing the background of the lighting circuit for the eighth embodiment of the present invention.

The circuit shown in FIG. 15 is similar to the circuit of the first embodiment in FIG. 3 except that the winding 18d for power source as shown in FIG. 3 is eliminated by connecting the current transformer 33 with the secondary winding 18S of the transformer so that an output signal from the current transformer 33 is input into the control device 19. The control device 19 in FIG. 15 can be replaced by the control device as shown in FIG. 16.

Figure 16:
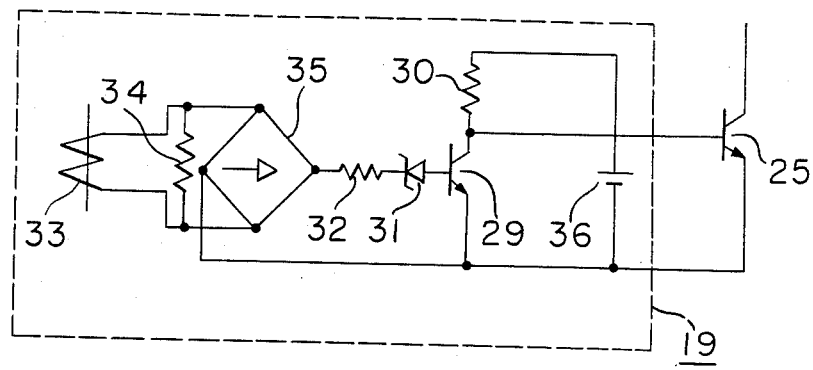
FIG. 16 is a circuit diagram of a control circuit applicable to the embodiment shown in FIG. 15.
Figure 17:
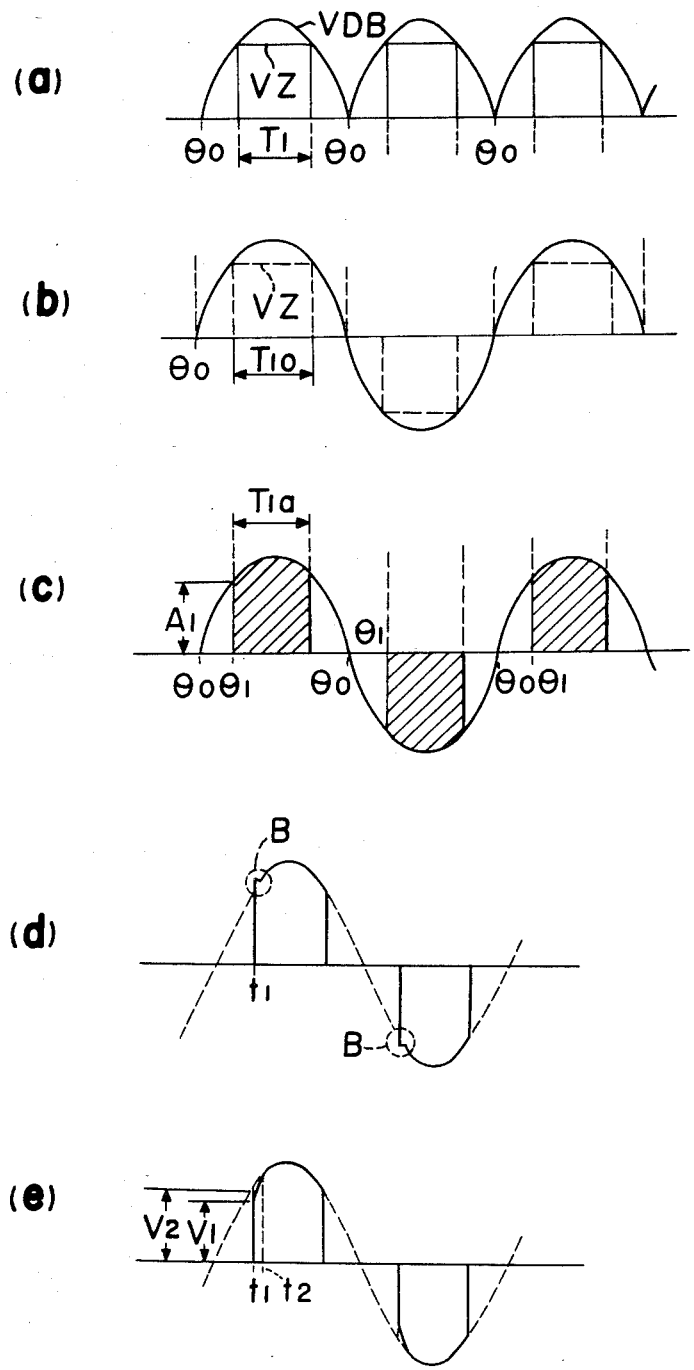
FIGS. 17(a), 17(b), 17(c), 17(d) and 17(e) are the diagrams for explaining the operations of the circuit shown in FIGS. 15 and 16.

In FIG. 16, the control device comprises an output resistor 34 of the current transformer 34, a full-wave rectification device 35 for rectifying an output from the current transformer 33, a constant voltage diode 31 connected with the full-wave rectification device 35 through a resistor 32 and a d.c. power source 36 for driving which can be constituted by rectifying and smoothing the output of an auxiliary winding provided in the transformer 18 of the inverter 15.

FIG. 17(b) shows an output voltage from the current transformer 33 and FIG. 17(a) shows an output voltage from the full-wave rectification device 35 respectively and naturally they are substantially the same phase as and similar waveform to the output current of the inverter 15.

In the lighting circuit of such construction as mentioned above, when the power source 11 is closed, the transistor 21a, 21b of the inverter 15 are opened and closed alternately to start its self-oscillation to thereby generate high frequency voltage.

When the lamp 16 initiates electric discharging, the current transformer 33 generates an output voltage. In this instant, the transistor 29 becomes conductive state in a period $T_{1a}$ including the maximum instantaneous value of the output current from the inverter 15. As the consequence of this, the discharge current glows through the lamp 16 during this period $T_{1a}$ as shown by the hatch-lined portion in FIG. 17.

The lamp 16 is lit in this way. However, when the electric discharge becomes difficult due to the service life of the lamp reaching its end, or no regular discharge can be done in any longer due to progress in consumption of one if the electrodes to bring about the asymmetrical discharge, etc., wherein the discharge is effected with only one of the polarities, there inevitably occurs the phenomenon to be mentioned in the following. That is to say, in case the switching device A is conductive during a period including the phase $\theta_0$ in FIG. 17(c) and this conductive state is interrupted at the phase $\theta_1$, there will be no problem at all so far as the current flows through the lamp 16. However, when no current flows in the lamp 16 for some reason, the choking coil 23 as the current limiting impedance is abruptly interrupted from its current flow to generate a high pressure voltage due to the counter-electromotive force, which is applied to the switching device A. On account of this, there is apprehension such that a large stress is applied to the component parts constituting the switching device to lower reliability of the device. This is also true with the case wherein the output transformer 18 is constructed as the leakage transformer, and no choking coil 23 is used.

In this eighth embodiment, therefore, attempt is made as to improving reliability of the switching device by providing a surge absorbing circuit having an appropriate response time without impairment being caused to the lamp operation.

First of all, prior to the explanations of the fifteenth embodiment of the lighting circuit according to the present invention, the basic principle of the present invention will be explained.

The rising part of the current and voltage in the lamp 16 (a time instant $t_1$ or its vicinity shown in FIGS. 17(d) and 17(e)), when the lamp is operated with the lighting circuit according to the eighth embodiment shown in FIG. 15, can be shown in an enlarged waveform in these figures of drawing. When the neighboring area of the time instant $t_1$ is observed in detail, it is seen that a current increase exists in the lamp current, as shown by a broken line in FIG. 17(d). This current increase varies in accordance with magnitude of impedance in the choking coil 23. Also, the lamp voltage at its rising part $t_1$ is at a lower value $V_1$ than a value $V_2$ which can be anticipated from the locus of the original inverter output voltage, as shown in FIG. 17(e), and it becomes substantially coincident with the locus of the original output voltage after the time instant $t_2$. A time required for this time period between $t_1$ and $t_2$ is approximately 2 $\mu$S (more accurately, longer than 1.5 $\mu$S but not reaching 3 $\mu$S) with a fluorescent lamp of 40 W capacity, for example. This phenomenon may be inferred due to the current flowing in the vicinity of the tube wall of the lamp at the restriking thereof for every half cycle, though the detailed reasons therefor is yet to be clarified.

The lighting circuit in this eighth embodiment of the present invention purports to effectively utilize the voltage dropping phenomenon to occur at the rising part of the lamp voltage as mentioned above, thereby reducing the voltage to be applied to the switching device. In the following, the embodiment will be explained in reference to the drawing.

Figure 18:
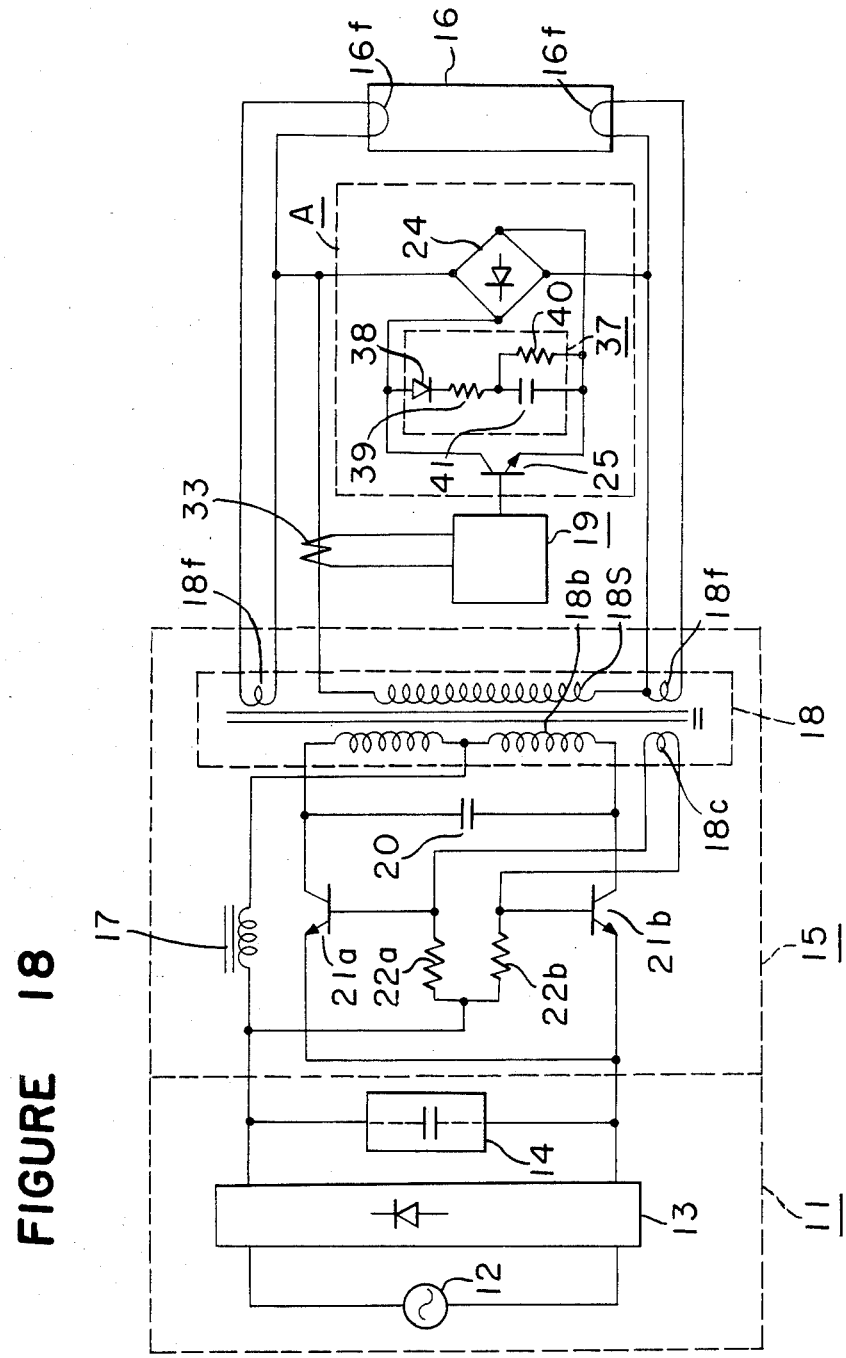
FIG. 18 is a diagram of the eighth embodiment of the lighting circuit according to the present invention.

Referring to FIG. 18, a reference numeral 37 designates a surge absorbing circuit, a numeral 38 refers to a diode, 39 and 40 refer to resistors, and 41 a capacitor. The remaining construction of the device according to this embodiment are the same as that shown in FIG. 15, hence the corresponding parts are designated by the same reference numerals and the explanations for them are dispensed with.

In the lighting circuit for the electric discharge lamp of the abovementioned construction, the surge absorbing circuit 37, in its normal operation, performs its charging operation to some extent at the rising part $t_1$ of the voltage at every half cycle of the lamp operation, although the main charging operation thereby is set to be in a constant which terminates within 3 $\mu$S. Accordingly, irrespective of presence of the surge absorbing circuit 37, the lamp 16 indicates its lamp voltage at a substantiall equal level to that when no surge absorbing circuit is provided.

In the following, explanations will be made as to a case when the lamp 16 is not in a position to perform its normal discharging operation. If it is now assumed that the lamp 16 is discharging from only one of the electrdoes 16f, 16f. In this case, the lamp operation is not different during its half cycle in the normal polarity, but, at the subsequent half cycle, the lamp 16 does not discharge, hence no current flows therein, at an instant when the switching device A is interrupted (corresponding to $t_1$ in FIG. 17(e)), whereby a high pressure voltage tends to be applied to the switching device A. At this instant, a charging current flows in the surge absorbing circuit 37 to restrain this high pressure voltage. While it is possible to contemplate various other construction for the surge absorbing circuit 37, it should contain therein at least a capacitor, a resistor serially connected with it, another resistor connected in parallel with it, and a diode. In this manner, the application of the high pressure voltage to the switching device A can be prevented by means of the surge absorbing circuit.

Figure 19:
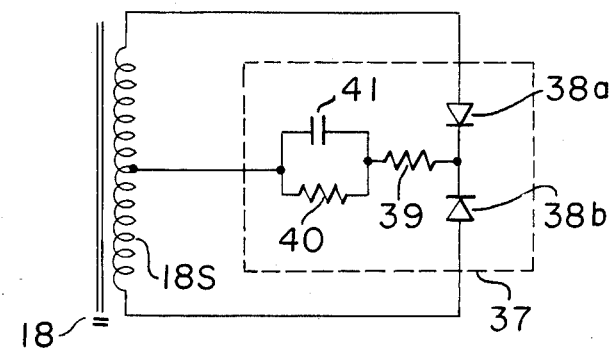
FIG. 19 is a diagram showing the ninth embodiment of the circuit according to the present invention.

In the case of the output transformer being the leakage type transformer, the surge absorbing circuit 37 may be constructed as in the above-described embodiment with respect to the secondary winding 18S; besides this, the circuit may be connected with the secondary winding through a middle point as shown in FIG. 19, or it may be connected with another winding of the secondary winding which is further provided at the secondary side.

Further, the connection of the surge absorbing circuit 37 in parallel with the switching device A as in the eighth embodiment shown in FIG. 18 is effective not only in the case of connecting the inductive impedance in series with the switching device A (the device construction as shown in FIG. 15), but also in the case of further connecting an auxiliary choking coil, etc. in parallel with the lamp and in series with the switching device A.

Besides the device shown in this embodiment, the inverter may be of such a construction that it is able to generate a substantially sinusoidal output and to supply a high frequency power having a pause-time period to the lamp, and that the main impedance for limiting the lamp current in the inverter is constructed with the inductive reactance. Moreover, the input d.c. voltage to the inverter may not necessarily be one which has been rectified and smoothed by the smoothing capacitor as in the foregoing embodiments, but it may be those such as pulsating current obtained without provision of the smoothing capacitor 14 or its equivalent component, or one obtained by using an appropriate auxiliary d.c. power source at this portion for the smoothing capacitor.

Furthermore, in the above-described eighth embodiment of the present invention, there has been indicated use of the current transformer 33 as the method for setting the pause-time period, but the invention may of course be applicable to the use of other expedient for realizing the pause-time period.

The switching device A may utilize various switching elements such as, for example, a field-effect transistor, etc. The method for connecting the switching device A may be of variety when the output transformer is the leakage type transformer, though any type of the connecting method is possible, provided that a desired high frequency power can be supplied. It is further feasible to combine it with an expedient for properly controlling the switching device A and also performing starting and preheating operations of the lamp.

In the following, explanations will be given as to the tenth embodiment of the present invention in relation to the circuit structure shown in FIG. 15. Before explaining the tenth embodiment, the operations of the lighting circuit according to the device shown in FIG. 15 will be explained in further details.

The circuit shown in FIG. 15 has such an advantage that the instantaneous value $A_1$ of the lamp current when the current begins to flow in the lamp 16 remains to be a constant value irrespective of variations in the power source voltage, etc., although, on the other hand, the device is supposed to have an inconvenience to be mentioned as follows. That is to say, when it is considered that the input d.c. voltage of the inverter 15 contains many ripples, for example, when the voltage as shown in FIGS. 20(a) and 20(c) is generated in the inverter 15, the peak value of the lamp current is also high during a period wherein the peak value of the output voltage is high, and the period $T_{1a}$ (refer to FIG. 17) during which the current flows through the lamp 16 becomes also long. On account of this, when the a.c. power source 12 increases, the power consumption of the lamp 16 increases much higher than the power source to thereby deteriorate the so-called "power source voltage variation characteristic"; and when the input d.c. voltage of the inverter 15 contains many ripples, even if the a.c. power source does not vary, the power consumption in the lamp at every half cycle of the high frequency inevitably varies to a large extent, and some other problems.

Figure 21:
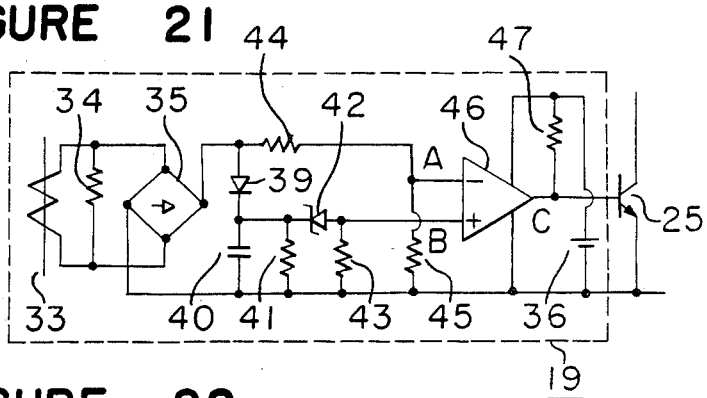
FIG. 21 is a circuit diagram of the tenth embodiment of the present invention.

Under such circumstances, there has further been contemplated the lighting circuit as shown in FIG. 21 paying attention to the abovementioned point.

FIG. 21 illustrates the control device 19 for the lighting circuit for the electric discharge lamp as the tenth embodiment of the present invention, the control device being applicable to the lighting circuit such as, for example, shown in FIG. 15. The control device as shown in FIG. 21 is constructed with the current transformer 33, the resistor 34, the full-wave rectifying circuit 35, resistors 44, 45 for detecting and dividing voltage of the inverter output current at every half cycle, the diode 39, the capacitor 40, the resistor 41, the constant voltage diode 42, the resistor 43, the voltage comparator 46, the resistor 47, the auxiliary d.c. power source for driving 36, and the transistor 25 for the switching device A. Incidentally, the terminal voltage of the capacitor 40 assumes a voltage analogous to an envelope of the peak value of the output current from the inverter 15 or to the input d.c. voltage into the inverter 15.

Figure 22:
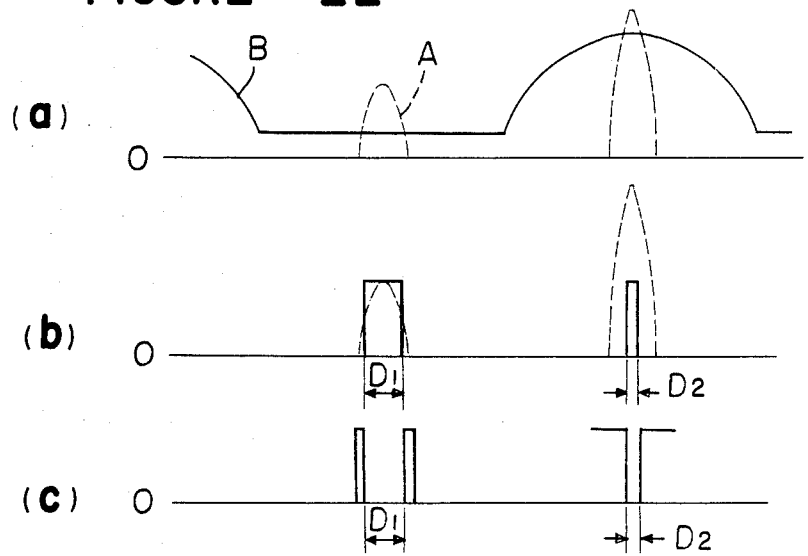
FIGS. 22(a), 22(b) and 22(c) are the diagrams for explaining the operations of the lighting circuit for the electric discharge device according to the present invention.

In the following, explanations will be given as to the operations of the control device 19 of the above-described construction, when it is used for the operating circuit for the electric discharge lamp as shown in FIG. 21. Assume now that the inverter 15 starts its operation, and the lamp 16 is operated. Then, there is applied to the input terminal B of the voltage comparator 46 a varying voltage of the peak value envelope of the output from the inverter as shown in FIG. 22(a) by the signal produced in the current transformer 33. Also, there is applied to the input terminal A of the voltage comparator 46 a voltage analogous to the high frequency output current as shown by a broken line in FIG. 22(a). In this way, the voltage comparator 46 has its output transistor rendered conductive during a period of the voltage at the input terminal A becoming higher than the voltage at the input terminal B thereof, i.e., during the periods of $D_1$ and $D_2$ as shown in FIG. 22(b), and the output terminal C assumes a low voltage level (as shown in FIG. 22(c)). Accordingly, the transistor 25 becomes non-conductive during the periods $D_1$ and $D_2$, and the current flows to the side of the lamp 16. Here, as is apparent from the state of the voltage at the terminal B, it is possible to prevent the period, during which the current flows through the lamp 16, from extending, even when the peak value of the output current from the inverter is large in comparison with a case wherein the peak is small, i.e., a relationship of $D_1 < < D_2$. Further, the period $D_1$ during which the peak value is small and the period $D_2$ during which the peak value is large can be appropriately set by selection of a voltage dividing ratio of the resistors 44, 45 and a zener voltage in the constant voltage diode 42.

In the above-described embodiment, the control of the circuit is effected in correspondence to the peak value of the output current from the inverter. It may however be feasible to effect the control in accordance with the input voltage for the inverter 15 by such means that, for example, a high frequency component is eliminated from the output voltage in the winding provided on the transformer 18 for the inverter 15, and the output voltage is rectified and applied to the input terminal B of the voltage comparator 46. It is also feasible that, in the state of the peak value of the output current from the inverter being lower than a predetermined value, as, for example, in the period during which the peak value is lower than the current value $A_L$ in FIGS. 20(b) and 20(d), the lamp current be so set that no pause-time period be provided therein.

In the foregoing explanations, use of the current transformer 33 in the control device 19 has been taken as an example, although other expedient may of course, be adopted, such as, for example, detection of current by use of a resistor, etc. Furthermore, a period during which the current is supplied to the lamp is set by use of the voltage comparator 46, which may also be carried out by other expedients. Moreover, in the above-described embodiment, the switching device A is a combination of the rectifying circuit 24 and the transistor 25, although the same effect can be obtained by use of the field-effect transistor, and other switching elements.

The inverter 15 may be of any type that is able to obtain a substantially sinusoidal output voltage at its output terminal, such as, for example, a serial inverter or a bridge type inverter provided with an output transformer. The current limiting impedance 23 for setting the lamp currrent at a predetermined value may not only be the inductance of the inductive reactance, but also the capacitance of the capacitive reactance.

In the above explanations, use of the choking coil 23 at the output terminal of the inverter 15 is taken as an example. However, the transformer 18 of the inverter 15 may also be constructed as the leakage type transformer.

The arrangement of the switching device A is possible other than that shown in the above-described embodiment. That is to say, an additional winding having an opposite polarity to that of the secondary winding 18S of the transformer 18 is provided, by way of which the switching device A is connected, or, in the case of the transformer 18 being the leakage type transformer, an intermediate tap is provided on the secondary winding and the switching device A is connected with a low pressure cable way to be formed by this intermediate tap. Or, it may also be feasible that an impedance is connected in series with the switching device A to thereby reduce the current flowing in the switching device. Furthermore, it may be feasible that the switching device A is connected in parallel with the lamp 16 through the electrodes 16f, 16f and the preheating current is caused to flow through it at the time of its conduction. Also, with a view to stabilizing the switching device even after starting of the electric discharge, when the lamp 16 is being operated, there may be added an expedient to maintain the switching device A without its being operated for some length of time. This can be realized by providing a timer circuit to maintain the output at the output terminal C of the voltage comparator 46 in the embodiment shown in FIG. 21 at a low output level during a predetermined period after closure of the power source, or by providing means for detecting the operating of the lamp 16 to control the output at the abovementioned output terminal.

Besides using the rectified and smoothed voltage as the power source for the device as shown in FIG. 15, the input d.c. voltage for the inverter 15 may also be the pulsating d.c. voltage as shown in FIG. 20(a), or the d.c. voltage as shown in FIG. 20(c) which is not perfectly smoothed, but obtained from the circuit constructed in combination with an appropriate d.c. power source, and so forth.

In the following, the eleventh embodiment of the lighting circuit according to the present invention will be described in reference to FIG. 23. In this embodiment, the period for supplying electric current to the lamp is maintained substantially constant irrespective of magnitude of the output current from the inverter or instantaneous variations in the input d.c. voltage for the inverter, thereby reducing variations in the power consumption in the lamp at every half cycle.

In the following, the eleventh embodiment of the present invention will be explained in reference to the drawing. In FIG. 23, the control device 19 is constructed, in addition to the full-wave rectifier 35 and the d.c. power source 36, the resistors 39 and 40, a transistor 41 having an output terminal L, monostable multi-vibrators 42, 43, each having an output terminal M and N and generating an output for a predetermined time period, resistors 44, 45 and 46, capacitors 47 and 48, and a transistor 49, thereby performing the drive-control of the transistor 25 in the switching device A.

Figure 23:
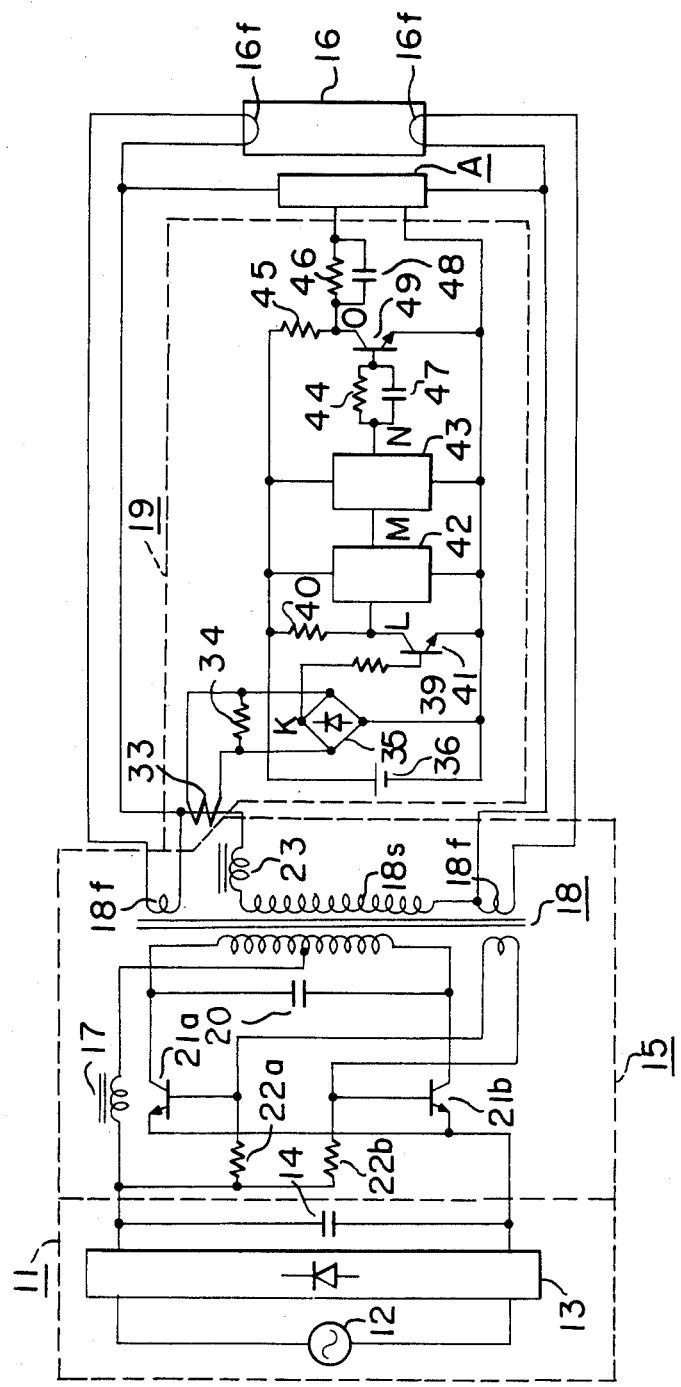
FIG. 23 is a diagram of the eleventh embodiment of the lighting circuit according to the present invention.
Figure 24:
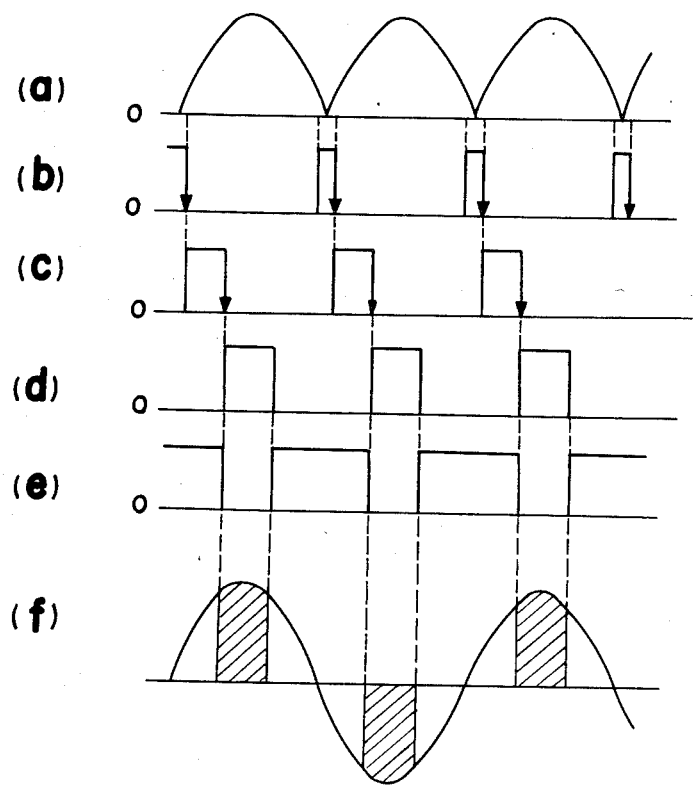
FIGS. 24(a), 24(b), 24(c), 24(d), 24(e), and 24(f) are operating waveform diagrams of the lighting circuit according to the twelfth embodiment of the present invention.

FIGS. 24(a) to 24(e) respectively indicate signals corresponding to the output terminals K to O shown in FIG. 23. FIG. 24(f) shows the output current from the inverter 15, in which the hatch-lined portion designates the current flowing in the lamp 16. Assume now that the inverter 15 generates a high frequency voltage and the lamp 16 commences the electric discharge. The output current from the inverter 15 flows in either the switching device A or the lamp 16, and voltage resulted from the full-wave rectification of the output voltage from the current transformer 33 is as shown in FIG. 24(a). During a period when the instantaneous value of this voltage is low, the transistor 41 is interrupted, and a synchronous signal as shown in FIG. 24(b) is obtained at the output terminal L. Here, the monostable multi-vibrators 42, 43 are of the type which is triggered by the trailing part (shown by an arrow ↓ in the drawing) of the input signal and performs the time limiting operation. Accordingly, the monostable multi-vibrators 42, 43 perform their predetermined time-limiting operation, whereby the output voltages as shown in FIGS. 24(c) and 24(d) are generated at their respective output terminals M and N. These voltages are reversed by the transistor 49, while the output from the output terminal O becomes as shown in FIG. 24(e), to drive the transistor 25 of the switching device A, whereby the current in the hatch-lined portion of FIG. 24(f) flows through the lamp 16. Since the period of this current flow is determined by the time-limiting operation of the monostable multi-vibrator 43, it can be maintained at a substantially constant level irrespective of the output current from the inverter 15.

Though, in the above-described embodiment, the synchronous signal is generated by use of the current transformer 33, there may be used any other means which is capable of operating the switching device A so that the current flowing in the lamp 16 may include therein the peak value and its vicinity of the output current from the inverter 15, and of being operated for a substantially constant time period. Further, while the switching device A according to this embodiment is a combination of the rectifying circuit 24 and the transistor 25, the same effect can be obtained by use of a field-effect transistor, or other switching elements. Furthermore, the connection of the switching device A can be effected by other method than the above-described embodiment. For instance, an additional winding having the opposite polarity to that of the secondary winding 18S of the transformer is provided, by way of which the switching device A is connected, or, in the case of the transformer 18 being constructed as the leakage type transformer without use of the choking coil 23, an intermediate tap is provided in the secondary winding 18S and the switching device A is connected with a low pressure cable way to be formed by this intermediate tap, or other winding may be made the low pressure cable way. Furthermore, it is also feasible to connect impedance in series with the switching device A so as to reduce the current flowing in the switching device A. It is moreover feasible that the switching device A is connected in parallel with the lamp 16 through the electrodes 16f, 16f and the preheating current is caused to flow at the time of its conduction. Also, with a view to preheating the electrodes 16f, 16f at the start of the lamp 16 and facilitating commencement of the electric discharge, there may be added an expedient to differentiate the conduction and interruption operations of the switching device A from those operations at the time of the normal operating. Besides using the rectified and smoothed power source as in the above-described embodiment, the input d.c. voltage for the inverter 15 may use a pulsating d.c. voltage as shown in FIG. 24(a), or a d.c. voltage obtained from a circuit constructed in combination with an appropriate auxiliary power source of low peak value as shown in FIG. 24(c). It is also feasible that, in the case of a voltage containing therein many ripples as such, the switching device A is kept in the interrupted state with the cycle having its peak value lower than a certain current value $A_L$ as shown in FIG. 24(d) by detecting the voltage level at the terminal K and controlling the transistor 49, and that the circuit of the present invention is operated with the cycle alone having the peak value higher than the current value $A_L$. Conversely, when the switching device A is operated only during a period of lower peak value than the current value $A_L$, the switching device may be of a low voltage withstand. On the other hand, it may be sufficient that the inverter 15 is of such a type that generates a substantially sinusoidal output voltage at the output terminal thereof, and uses the capacitive or inductive reactance as the current limiting impedance to set the lamp current. As an example, a serial inverter or a bridge type inverter provided with the output transformer is also useful.

In the following, explanations will be made as to the thirteenth embodiment of the lighting circuit according to the present invention. This embodiment is of such a construction that, when the lamp does not perform its normal electric dischage, the switching device connected in parallel with the lamp is conducted and maintained to thereby prevent application of the surge voltage to the switching device or generation of excessive inverter current.

Figure 25:
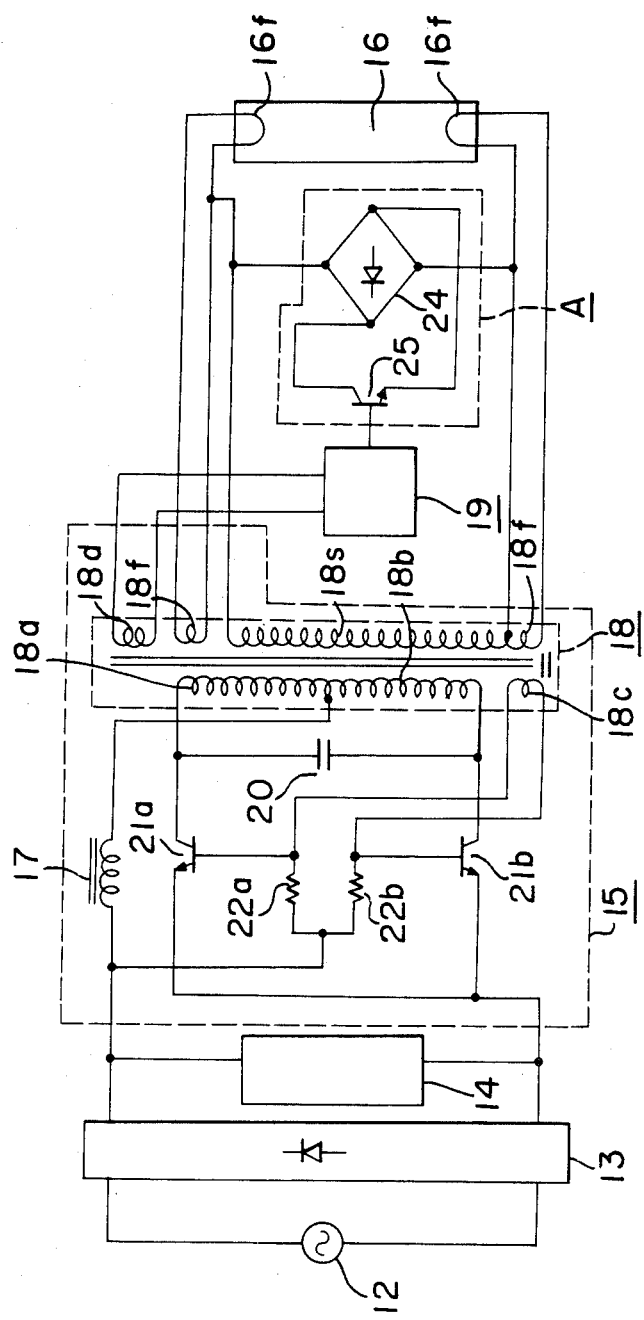
FIG. 25 is a diagram showing the thirteenth embodiment of the lighting circuit according to the present invention.
Figure 26:
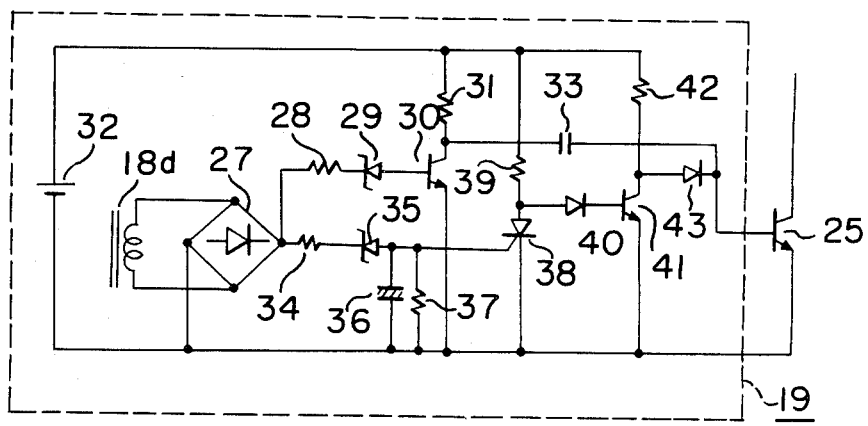
FIG. 26 is a diagram for a control device relative to the thirteenth embodiment of the lighting circuit according to the present invention.

The entire circuit structure of the thirteen embodiment is shown in FIG. 25 and is substantially the same as that of the first embodiment as shown in FIG. 3, provided that the choking coil 23 is not connected to the secondary winding 18S and the construction of the control device 19. FIG. 26 shows the construction of the control device 19 for use in the circuit of FIG. 25, which comprises resistors 34, 37, 39, and 42, the constant voltage diode 35, the capacitors 33, 36, the thyrister 38, the diodes 40, 43, and the transistor 41.

Figure 27:
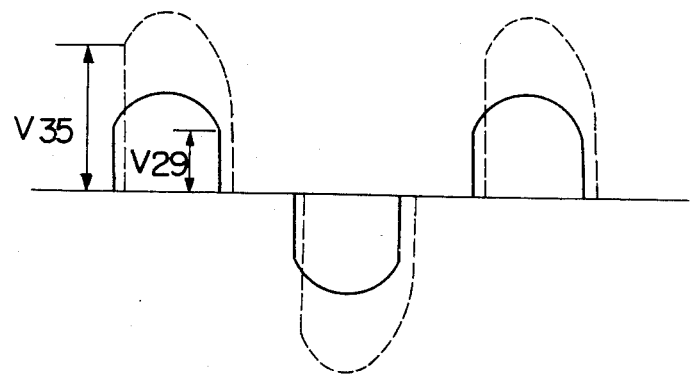
FIG. 27 is a diagram for explaining the operation of the circuit according to the thirteenth embodiment of the present invention.

In the above-described construction, when the lamp 16 is operating in its normal condition, the voltage in the control winding 18d is as shown by a solid line in FIG. 27. When the output voltage from the full-wave rectifier 27 becomes higher than a set voltage $V_{29}$ in the constant voltage diode 29, the transistor 30 becomes conductive, and, after a predetermined time to be decided by the resistor 31 and the capacitor 33, the transistor 25 is interrupted, whereby the output current in the inverter 15 flow through the lamp 16. Also, when the output voltage from the full-wave rectifier 27 becomes lower than the set voltage $V_{29}$, the transistor 30 is interrupted, the transistor 25 becomes conductive, and the current does not flow through the lamp 16. On the contrary, when the lamp 16 is in an abnormal condition such as, for example, no discharging or the asymmetrical discharging due to the end of its service life, the voltage in the control winding 18d becomes higher as shown by a dot line in FIG. 27 than the voltage during its normal operation (shown by the solid line); in particular, in its asymmetrical discharging, the voltage increases from its normal voltage level at either positive or negative polarity in the waveform as shown in FIG. 27. In this way, when the output voltage from the full-wave rectifier 27 becomes higher than a set voltage $V_{35}$ in the constant voltage diode 35, the thyrister 38 becomes conductive and the transistor 41 is interrupted. On account of this, the base current continues to flow in the transistor 25 through the resistor 42, and the transistor 25 maintains its conductive state, whereby a high voltage is no longer applied to the lamp 16. As the result of this, increase in current and voltage due to the asymmetrical discharging and generation of the high surge voltage at the time of non-lighting of the lamp are prevented. The capacitor 36 and the resistor 37 function to prevent the thyrister 38 from becoming conductive at the time of the operating of the lamp 16, either at the initial stage of its operating or until commencement of its operating.

Incidentally, in the above-described embodiment, when the thyrister 38 becomes once conductive, this conductive state is maintained; however, after lapse of a predetermined time period using a timer, etc., the switching device A may be reinstated to its interrupted state. The current to flow during maintenance of the switching device A in its conductive state may be set at a value which is not very much different from that during the operating of the lamp by setting the leakage inductance of the output leakage transformer 18 in the inverter 15; however, it is also feasible to provide the impedance 26 as has been done heretofore. As the preheating method of the lamp electrode 16f, it is also useful that the switching device A is connected in parallel with the lamp 16 through its filament; at the time of operating of the lamp, the conduction period of the switching device A is extended (or the interruption period T, may be eliminated) to sufficiently preheat the filament, thereafter, the period $T_0$ is made shorter (or may be eliminated) to facilitate commencement of the electric discharge in the lamp 16; and after the operating, the periods $T_0$ and $T_1$ are reinstated to their original set values. In the foregoing explanation, use is made of the voltage in the control winding 18d wound at the secondary side of the leakage type output transformer 18 as the input signal into the control device 19. This object can be achieved by use of a voltage substantially analogous to the voltage across the lamp 16: for example, a signal generating transformer is connected in parallel with the lamp 16, and the voltage in the winding provided on this transformer is used as the input signal into the control device 19, in which case there may also be used a construction wherein the impedance 26 is connected. Next, where there is a phase difference between the input signal and the voltage across the terminals of the lamp 16, this phase difference may be compensated to subject the switching device A to the open and close controls. This can be realized, in the case of the leakage type transformer as in this embodiment, by appropriate adjustment of the winding position of the control winding 18d.

In this thirteen embodiment of the present invention, the switching device A is operated by the voltage in the control winding 18d for both its normal and abnormal operations. However, it is also feasible that the normal operation is perfomed by, for example, detecting the current flowing in the inverter 15 or the lamp 16 to provide an appropriate pause-time period, and, at the abnormal operation, the switching device A is operated by obtaining a voltage substantially analogous to the voltage across the terminals of the lamp 16 as in this embodiment. Conversely, it is also feasible that other means be provided to cause the switching device to perform the operations in conformity to its normal operations and its abnormal operations by detection of the current flowing through the lamp 16 or of the output current from the inverter 15.

For the inverter 15, the self-oscillating push-pull inverter as used in this embodiment is suitable. Besides this, however, other types of the inverter may be used, which is capable of stopping the power supply to the lamp 16 at the rising part of a substantially sinusoidal output current at every half cycle thereof, and of supplying the power to the lamp at the maximum instantaneous value of the current or in its vicinity. The output transformer 18 may also not necessarily be of the leakage type. It is of course possible that, depending on the kind of the current limiting impedance of the lamp 16, when the impedance 26 connected in series with the switching device A is to be provided, the transformer may be constructed with a capacitor. From the standpoint of quicken the trailing of the current to be supplied to the lamp 16, the latter is preferable. Furthermore, when the choking coil is used as the impedance 26, it may be connected with the output side of the full-wave rectifying circuit 24.

For the auxiliary d.c. power source 14 to the inverter 15, there may be used a low d.c. voltage to be obtained by use of a transformer, etc., besides a well known smoothing circuit, or a d.c. voltage generated from a divided voltage due to the series connection of a plurality of capacitors, or other means. In short, the power source may contain therein the ripples, if only the required electric discharge of the lamp 16 can be maintained.

Furthermore, in the above-described embodiment, the switching device A is constructed with the rectifying circuit 24 and the transistor 25. However, it may be made up of other switching elements having the required characteristic. The connection of the switching device A can be done by other methods than the above-described one, provided that a power supply stoppage period to the lamp 16 can be provided.

So far the present invention has been described with reference to particular embodiments thereof, it should be noted that the present invention is not limited to these embodiments alone, but any changes and modifications may be made by those skilled in the art within the spirit and scope of the invention as recited in the appended claims.

We claim:

1. A lighting circuit for an electric discharge lamp, which comprises: an inverter which functions to convert a direct current power to a high frequency output power in a substantially sinusoidal waveform and operate a low pressure electric discharge lamp; a switching device provided at an output side of said inverter and supplying discharge current to said electric discharge lamp through its opening and closing operations; and a control device which controls said switching device so as to supply an output to said electric discharge lamp during a period including a peak value and its vicinity of an instantaneous value at each half cycle of the output from said inverter at the time of operating of said electric discharge lamp.

2. The lighting circuit for an electric discharge lamp according to claim 1, characterized in that said inverter operates said electric discharge lamp with a reactive current limiting impedance and that there is provided at the output side of said inverter a surge absorbing circuit which absorbs a surge voltage to be generated at the time of interruption of said switching device, wherein the charging operation of said surge absorbing circuit is set at a time constant which terminates at substantially 3 $\mu$S or shorter at every half cycle of the high frequency voltage.

3. The lighting circuit for an electric discharge lamp according to claim 1, characterized in that said inverter operates said electric discharge lamp with a reactive current limiting impedance and that length of the interruption period of said switching device is made variable so that variations in the power of said electric discharge lamp at every half cycle may be smaller than variations in the peak value of the instantaneous value at every half cycle of the output current from said inverter.

4. The lighting circuit for an electric discharge lamp according to claim 1, characterized in that said inverter operates said electric discharge lamp with a reactive current limiting impedance and that length of the interruption period of said switching device is maintained substantially constant during a normal operation time thereof.

5. The lighting circuit for an electric discharge lamp according to claim 1, characterized in that said inverter operates said electric discharge lamp with a reactive current limiting impedance and is provided with detection means to detect no discharge or asymmetrical discharge from the electric discharge lamp, wherein said switching device is so maintained conductive for at least a certain predetermined time in accordance with detection by said detection means.

6. The lighting circuit for an electric discharge lamp according to claim 1, characterized in that said switching device is connected in series with the low pressure electric discharge lamp.

7. The lighting circuit for an electric discharge lamp according to claim 1, characterized in that said switching device is connected in parallel with the low pressure electric discharge lamp.

8. The lighting circuit for an electric discharge lamp according to claim 1, characterized in that said high frequency inverter has a high frequency choking coil at its input terminal.

9. The lighting circuit for an electric discharge lamp according to claim 1, characterized in that it further comprises a control device to effect power supply to the low pressure electric discharge lamp for a plurality of numbers of times during a half cycle of the output voltage.

10. The lighting circuit for an electric discharge lamp according to claim 1, characterized in that the input voltage to said high frequency inverter is a pulsating voltage obtained by full-wave rectification of alternating current voltage.

11. The lighting circuit for an electric discharge lamp according to claim 1, characterized in that at least one of the voltage and the current in the active elements of said high frequency inverter is in a substantially sinusoidal waveform.

12. The lighting circuit for an electric discharge lamp according to claim 2, characterized in that said inverter is a transistor inverter which performs self-oscillation, and an output transformer is constructed with a leakage transformer.

13. The lighting circuit for an electric discharge lamp according to claim 3, characterized in that said inverter is a transistor inverter which performs self-oscillation, and an output transformer is constructed with a leakage transformer.

14. The lighting circuit for an electric discharge lamp according to claim 4, characterized in that said inverter is a transistor inverter which performs self-oscillation, and an output transformer is constructed with a leakage transformer.

15. The lighting circuit for an electric discharge lamp according to claim 5, characterized in that said inverter is a transistor inverter which performs self-oscillation, and an output transformer is constructed with a leakage transformer.

16. The lighting circuit for an electric discharge lamp according to claim 7, characterized in that said inverter is a separately excited inverter.

17. The lighting circuit for an electric discharge lamp according to claim 14, characterized in that said switching device operates during a period when the input d.c. voltage to said inverter is at a low voltage level, and maintains its interruption condition during a period when the input d.c. voltage is at a high voltage level.

18. The lighting circuit for an electric discharge lamp according to claim 15, characterized in that a control winding of said control device to be the detection means is provided at the secondary side of a leakage type transformer.

19. The lighting circuit for an electric discharge lamp according to claim 17, characterized in that said switching device operates during a period when the input d.c. voltage to said inverter is at a high voltage level, and maintains its interruption condition during a period when the input d.c. voltage is at a low voltage level.

* * * * *